United States Patent
Fanciullo et al.

(10) Patent No.: US 7,433,765 B2
(45) Date of Patent: Oct. 7, 2008

(54) FLY BY WIRE STATIC LONGITUDINAL STABILITY COMPENSATOR SYSTEM

(75) Inventors: Todd M. Fanciullo, New Haven, CT (US); Phillip J. Gold, Shelton, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 641 days.

(21) Appl. No.: 11/120,827

(22) Filed: May 3, 2005

(65) Prior Publication Data

US 2006/0253230 A1    Nov. 9, 2006

(51) Int. Cl.
*B64C 27/04* (2006.01)
*B64C 37/00* (2006.01)
*G06F 19/00* (2006.01)

(52) U.S. Cl. ............ 701/3; 701/7; 701/8; 244/17.25; 340/974

(58) Field of Classification Search ............ 701/3, 701/11, 7, 8, 4, 14; 340/967, 974, 969; 244/17.13, 244/17.25, 17.11, 195
See application file for complete search history.

(56) References Cited

U.S. PATENT DOCUMENTS

| | | | |
|---|---|---|---|
| 4,628,455 A * | 12/1986 | Skutecki | 701/7 |
| 5,478,031 A * | 12/1995 | Piche | 244/195 |
| 5,863,012 A | 1/1999 | Rollet et al. | |
| 6,735,500 B2 | 5/2004 | Nicholas et al. | |
| 6,819,266 B2 * | 11/2004 | Greene | 340/969 |

* cited by examiner

*Primary Examiner*—Tan Q Nguyen
(74) *Attorney, Agent, or Firm*—Carlson, Gaskey & Olds (57) ABSTRACT

A static longitudinal stability (SLS) system provides an unobtrusive airspeed hold function that reacts to the pilot control inputs into the flight control system and the measured states of the aircraft to engage and disengage smoothly without any explicit mode selection by the pilot. The SLS engages airspeed hold when the aircraft is close to trimmed, non-accelerating state. This logic allows the pilot to either fly close to a desired airspeed and let SLS engage, or trim the aircraft in an accelerating/decelerating maneuver and just wait for the SLS to capture a speed when longitudinal acceleration is small. The SLS is not dependant on the pilot specifically selecting this mode, but rather engages and disengages in response to flight control system status and how the aircraft is being maneuvered.

18 Claims, 8 Drawing Sheets

FIG. 1

FIG. 2A — STATIC LONGITUDINAL STABILITY ENGAGE LOGIC

FIG. 2B

STATIC LONGITUDINAL STABILITY ENGAGE LOGIC

FIG. 5 ADAPTIVE SYNCHRONIZER

FLY BY WIRE STATIC LONGITUDINAL STABILITY COMPENSATOR SYSTEM

BACKGROUND OF THE INVENTION

The present invention relates to a fly-by-wire flight control system, and more particularly to an airspeed hold system.

Fly By Wire (FBW) flight control systems are emerging as state of the art in control of rotary-wing aircraft. FBW permits a wide range of improvements that contribute to pilot workload reductions. Although significant benefits are realized with FBW systems, advanced system hardware may alter the pilot-vehicle interface in such a way that civil certification requirements may not be met. Special provisions must then be made in the control system to meet these requirements, which may compromise performance benefits of FBW.

The static position of the longitudinal cyclic flight controls which control aircraft pitch altitude, change as a function of aircraft flight conditions. The pilot typically retrims the forces felt on the stick each time the flight conditions (speed of forward travel, climb/decent angle) are changed. Such retrimming minimizes or cancels out the static control forces to increase pilot comfort and flying accuracy. However, the need to constantly retrim the forces on the cyclic stick may itself increase pilot workload. To reduce this workload, FBW systems are introducing advanced control laws and unique trim control devices which allow the pilot to center the control stick when the helicopter is not being maneuvered. These FBW changes mask the relationship between airspeed, rotor disk position, and cyclic stick position, and pose particular complications to FAA certification.

In a rotary wing aircraft, forward longitudinal cyclic pitch generally increases with airspeed. That is, the equilibrium longitudinal position of the cyclic stick in a conventional control system generally represents the speed of forward travel: a forward position corresponds to a higher steady forward speed, a rearward position to a lower steady forward speed. This also imposes a consistency of action between short-term commands and long-term commands (equilibrium) for variation in speed. In the short term, a demand to increase speed requires a pitch-down command (tilting the rotor disk forward) and a shifting of the cyclic stick forward. Furthermore, some rotary-wing aircraft may have neutral or negative longitudinal static stability in a certain speed range. This speed range generally results in an increase in pilot workload as the position of the cyclic stick in equilibrium moves back as the speed increases for a constant collective pitch. To change from one steady speed to another, higher one, without touching the collective pitch lever, the pilot has first of all to push the stick forward (pitch-down command) then bring it back into a static position further back than the initial position in order to stabilize the speed. Also, following an external disturbance and in the absence of a corrective action from the pilot, the aircraft may tend to drift away from its steady speed without tending to return (velocity disturbance), at least until the aircraft returns to a region of positive static stability, if one exists.

In order to correct such instability, various conventional trim compensation systems are utilized. One conventional trim control system mechanically offset the position of the cyclic stick. However, this approach only provides the pilot with apparent static stability without improving the velocity disturbance rejection capabilities of the aircraft. Another conventional trim control system for military-type rotary-wing aircraft utilize complex neural networks which, although effectively predicting aircraft flight regimes, will not provide a seamless transition between Rate Command/Attitude Hold response and an Airspeed Hold function. Such systems are exceedingly complex, specific to certain aircraft and are not practical for FAA certification.

Accordingly, it is desirable to provide a FBW static longitudinal stability system which provides an unobtrusive airspeed hold function that reacts to pilot control inputs and the measured states of the aircraft to engage and disengage smoothly without any explicit mode selection by the pilot when the aircraft is in a trimmed, non-accelerating state.

SUMMARY OF THE INVENTION

A flight control system according to the present invention provides a static longitudinal stability (SLS) control designed to provide an unobtrusive airspeed hold function that reacts to the pilot control inputs into the flight control system and the measured states of the aircraft to engage and disengage smoothly without any explicit mode selection by the pilot. The intent of the system is to provide airspeed hold when the aircraft is in a trimmed, non-accelerating state. This mode is only provided when the Full Primary Flight Control System (PFCS) mode is available, i.e. there are no losses of sensor data, and the pilot has not engaged any other automatic or Flight Director stabilization modes. Other criteria that enable the mode include the following: the high speed turn coordination set logic is TRUE (airspeed >50 kt), the absolute bank angle is less than a predefined envelope that allows standard rate turns (plus a 10% margin), and the absolute pitch attitude is less than 25 degrees. The intent is to enable SLS inside a limited envelope and for standard rate turns.

The SLS engagement requires that the aircraft be close to a near-trimmed state. This logic will not "set" unless pitch, roll, and yaw rates are small and longitudinal and lateral linear accelerations are also small. This logic allows the pilot to either fly close to a desired airspeed and let SLS engage, or he can trim the aircraft in an accelerating/decelerating maneuver and just wait for the SLS to capture a speed when longitudinal acceleration is small. Note that the yaw rate envelope is sufficiently large to encompass turning flight consistent with the bank angle limits in the enable logic. Once engaged, the system will disengage if any of the following occur: the SLS enable logic goes FALSE, the absolute pilot/copilot longitudinal stick command is out of detent for more than 0.5 seconds or exceeds the absolute lateral stick command up to a value of 10%, the absolute shaped yaw command is greater than 10%, the longitudinal beeper is activated, the longitudinal cyclic rotor command is on its limit, or the PFCS_CLAWS_IC_LOGIC is TRUE. Note that this logic is not dependant on the pilot specifically selecting this mode, but rather engages and disengages in response to flight control system status and how the aircraft is being maneuvered.

The present invention therefore provides a FBW static longitudinal stability system which provides an unobtrusive airspeed hold function that reacts to pilot control inputs and the measured states of the aircraft to engage smoothly without any explicit mode selection by the pilot when the aircraft is in a trimmed, non-accelerating state and disengages smoothly when the pilot commands an aircraft pitch or yaw maneuver.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 2A:
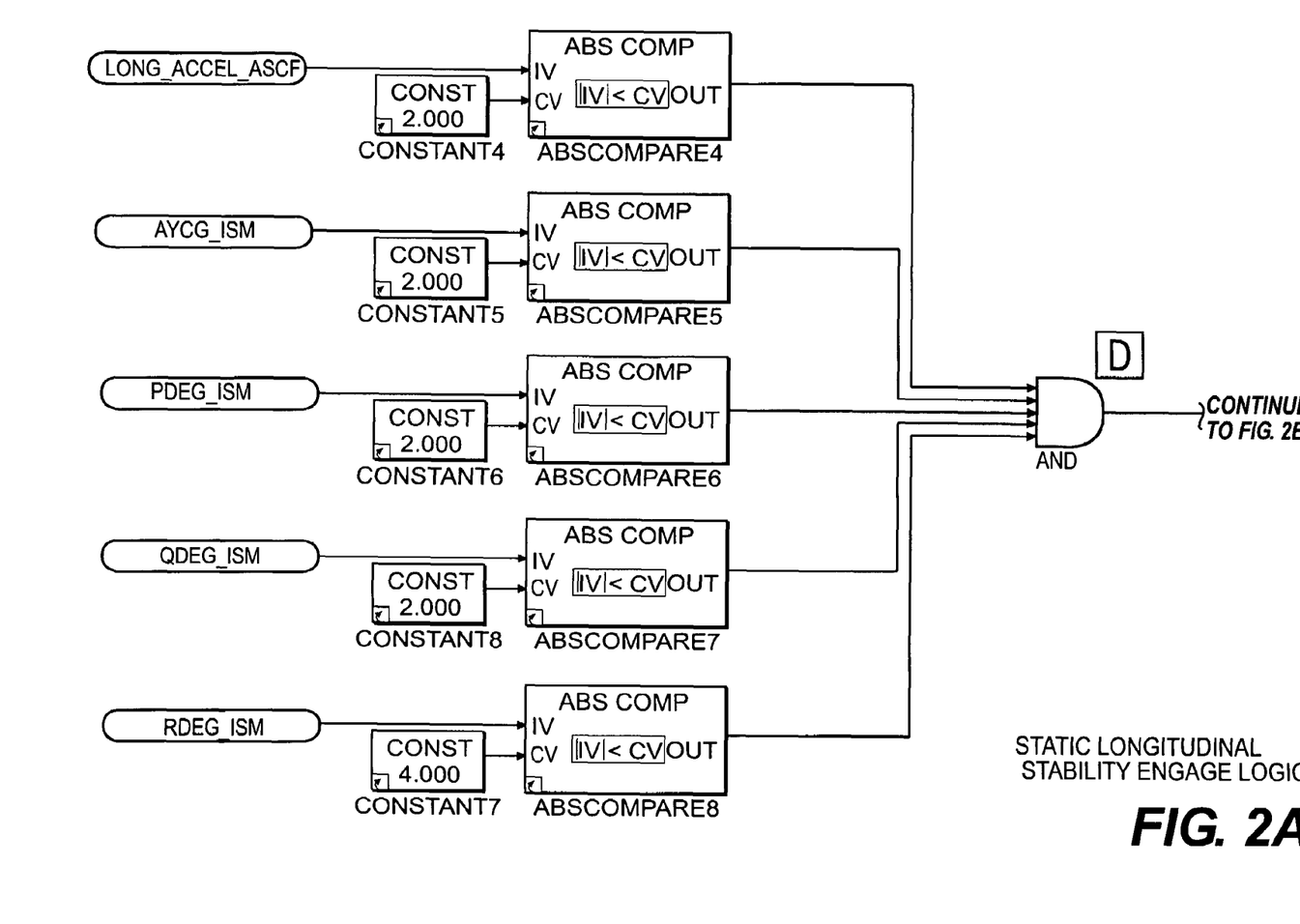
FIGS. 2A and 2B are a block diagram of a static longitudinal stability engage/disengage logic for a fly-by-wire flight control for a rotary wing aircraft.
Figure 2B:
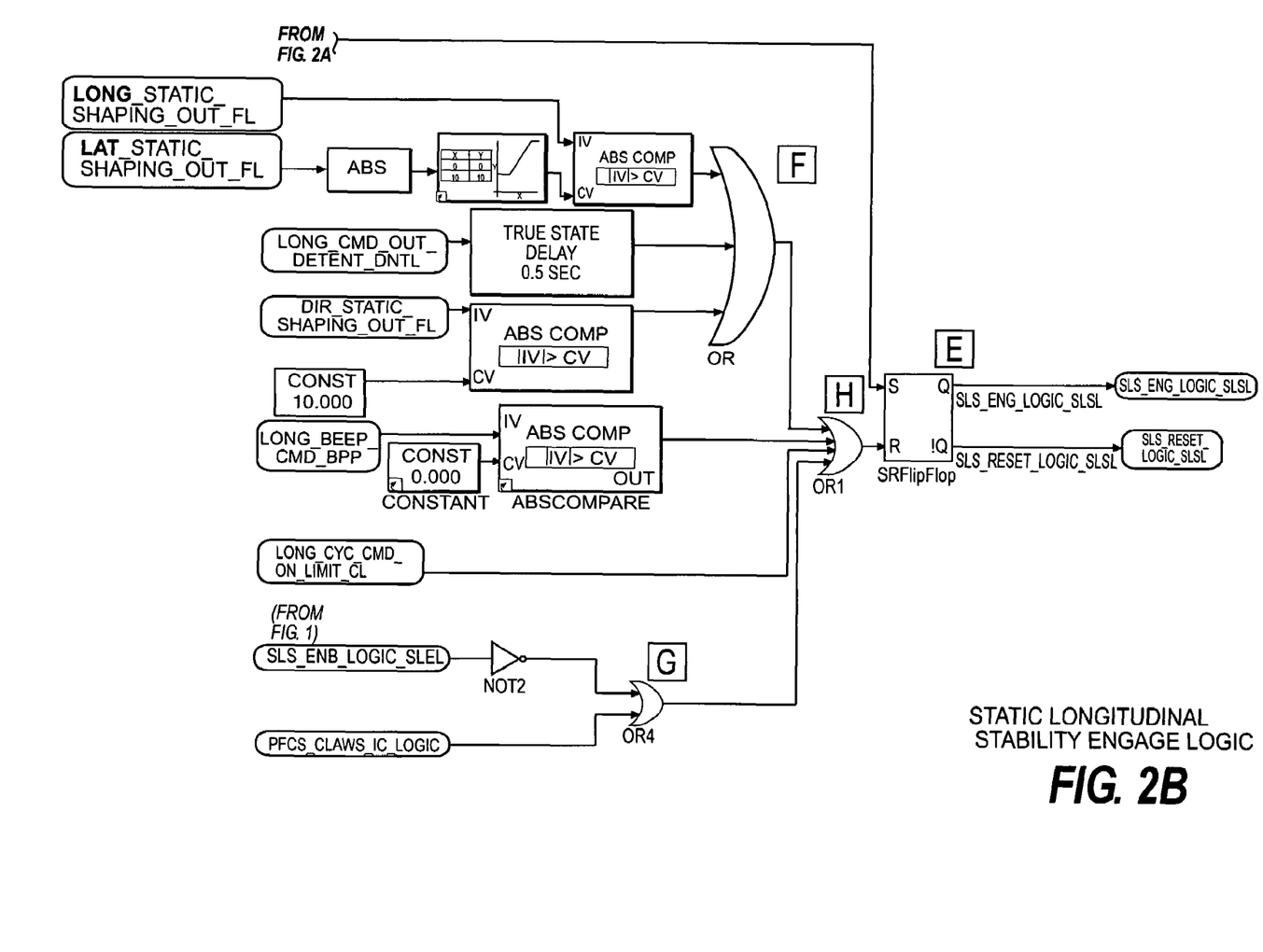
Figure 3A:
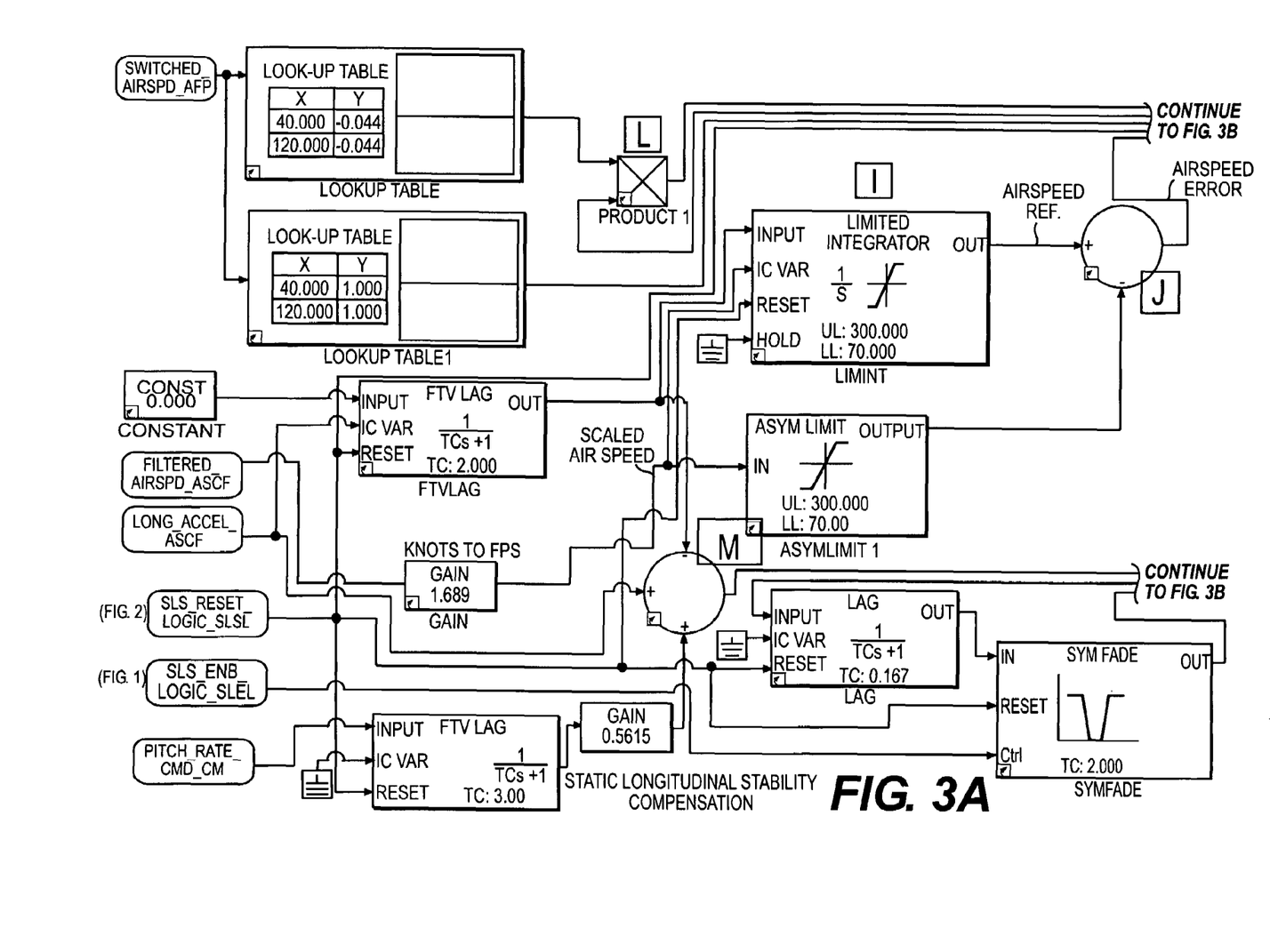
FIGS. 3A and 3B are a block diagram of a static longitudinal stability compensation control laws for a fly-by-wire flight control for a rotary wing aircraft.
Figure 3B:
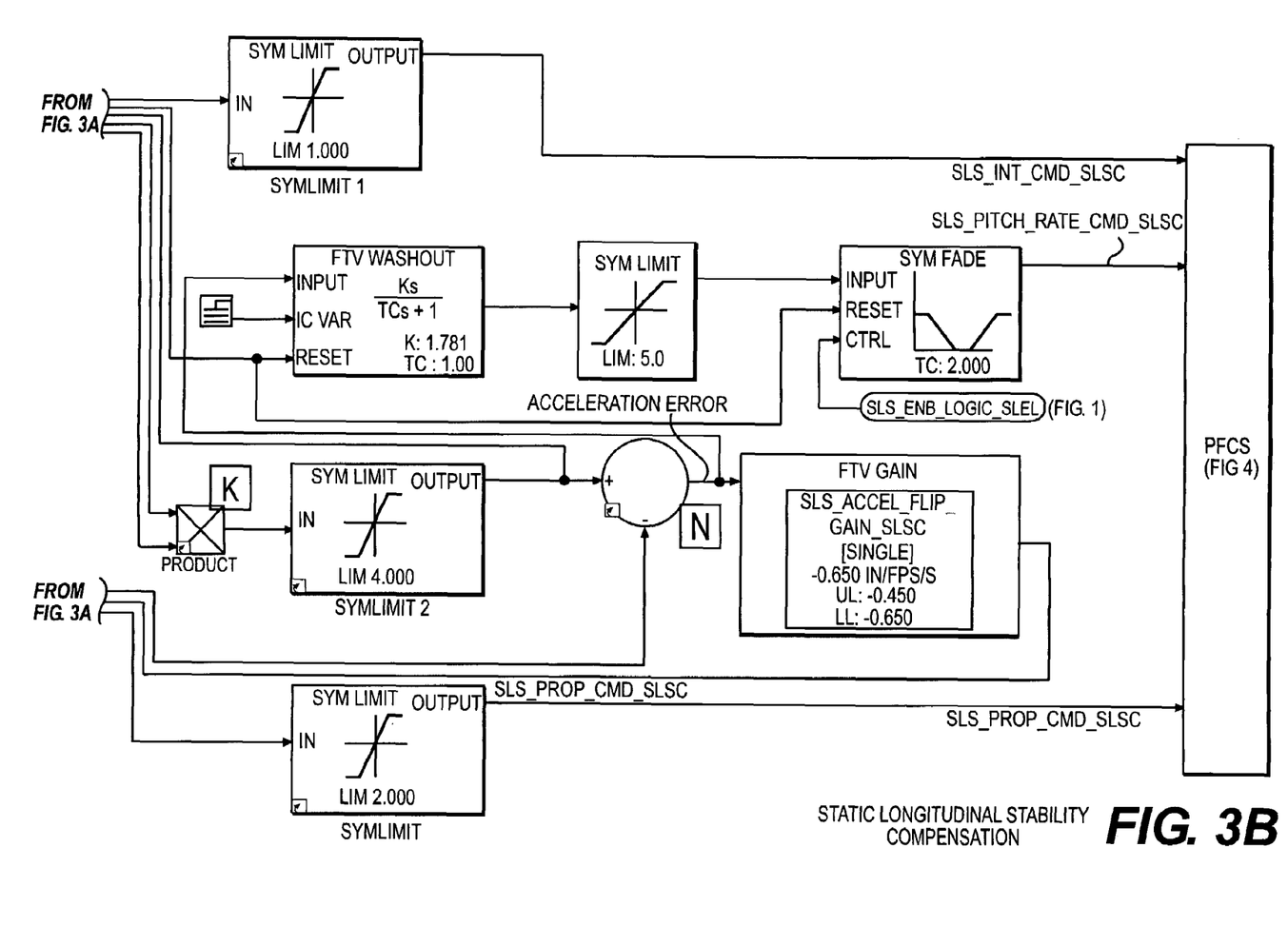

The Static Longitudinal Stability (SLS) Compensation System designed according to the present invention is divided into three sections: enable logic (FIG. 1), engage logic (FIGS. 2A and 2B), and compensation shaping (FIGS. 3A and 3B).

Determining the trim condition necessary to enter airspeed hold requires monitoring aircraft states and interpreting pilot inputs. The flight regime for which this is applicable includes high-speed steady level flight (V>50 knots), coordinated turns of reasonable aggressiveness, and gentle ascents and descents. Linear accelerations, angular rates, and bank angle are used to determine aircraft trim. Additional parameters can be monitored to tailor mode engagement requirements for a given control strategy. Pilot interaction with the system also dictates mode transition. Certain pilot input will cause the mode to disengage. Pilot stick or beeper interaction automatically switches the control system to the desired Rate Command/Attitude Hold control strategy so that handling qualities benefits are not sacrificed. Disengagement threshold for aircraft states are preferably not equivalent to the engagements thresholds. It is desirable to have the compensator stay engaged when a gross disturbance is encountered. However, logic may additionally be provided so that during severe turbulence, the pilot is forced to interact with the system.

Figure 1:
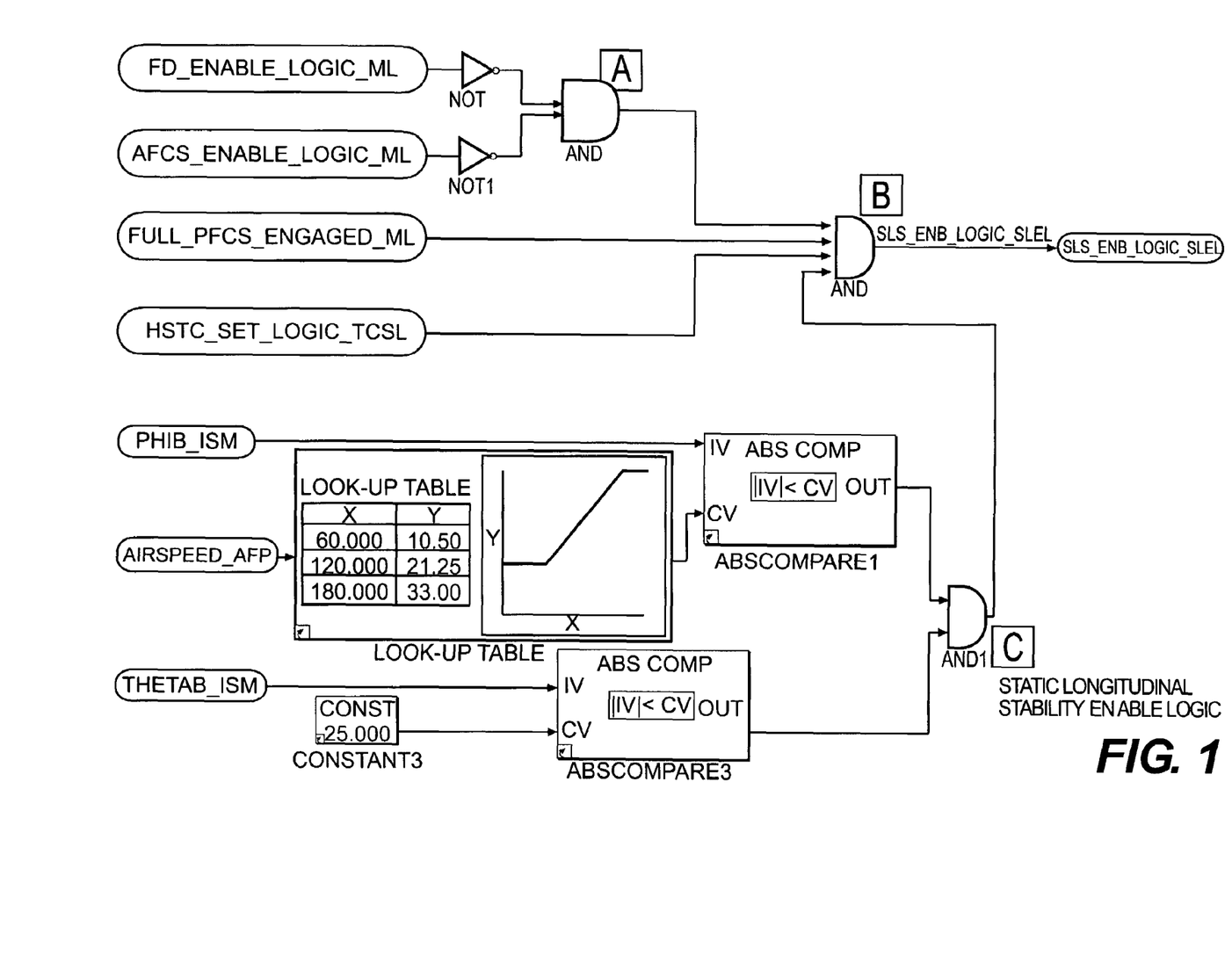
FIG. 1 is a block diagram of a static longitudinal stability enable logic for a fly-by-wire flight control for a rotary wing aircraft.

Referring to FIG. 1, a block diagram of the static longitudinal stability enable logic is schematically illustrated. Input "FD_ENABLE_LOGIC_ML," flight director enable logic, and input "AFCS_ENABLE_LOGIC_ML," AFCS enable logic, are passed through NOT functions; so that the output of each NOT is TRUE when the inputs are FALSE (i.e. the FD and AFCS are not enabled). The output of each NOT function is passed to AND gate "A." The output of AND gate "A" is passed to AND gate "B." Other inputs to AND gate "B" include input "FULL_PFCS_ENGAGED_ML," Full PFCS Engaged logic, and input "HSTC_SET_LOGIC_TCSL," High Speed Turn Coordination (HSTC) Set logic. Full PFCS Engaged logic is TRUE when the rate, attitude and airspeed data is available to the flight control system and the aircraft is airborne. HSTC Set logic is TRUE when airspeed is greater than or equal to 50 kts.

To enable the SLS function in shallow turns, input "PHIB_ISM," the aircraft bank angle phib, is compared to the output of a lookup table driven by input "AIRSPEED_AFP," airspeed. The table output is the bank angle for a standard rate turn (3 degrees/second) plus a 10% margin. The output of the absolute compare function is TRUE when the absolute of the input value is less than the compare value (|IV|<CV). This output is passed to AND gate "C." Input "THETAB_ISM," the aircraft pitch attitude, is compared to a value of 25 degrees and the output of this absolute compare is also passed to AND gate "C." The output of AND gate "C" is passed to AND gate "B" and the output of "B" is the SLS Enable logic "SLS_ENB_LOGIC_SLEL." It should be understood that specific numeral values referenced herein are to one embodiment, and that other values specific to a particular aircraft are also usable with the present disclosure.

FIGS. 2A and 2B are a block diagram of the SLS engage logic. Input "LONG_ACCEL_ASLF," filtered longitudinal acceleration, is passed to an absolute compare function where it is compared with a value of 2 feet/sec$^2$. The output of the absolute compare is TRUE when the absolute input value is less than the compare value. This output is passed to AND gate "D." Input "AYCG_ISM," filtered lateral acceleration, is passed to an absolute compare function where it is compared with a value of 2 feet/sec$^2$. The output is passed to AND gate "D." Input "PDEG_ISM," body-axis roll rate, is passed to an absolute compare function where it is compared with a value of 2 degrees/sec. The output is passed to AND gate "D." Input "QDEG_ISM," body-axis pitch rate, is passed to an absolute compare function where it is compared with a value of 2 degrees/sec. The output is passed to AND gate "D." Input "RDEG_ISM," body-axis yaw rate, is passed to an absolute compare function where it is compared with a value of 4 degrees/sec. The output is passed to AND gate "D." The output of AND gate "D" is the "set" input to latch function "E." Output "SLS_ENG_LOGIC_SLSL" of the latch, SLS engage logic, is set TRUE when the set input is TRUE, and remains TRUE (whether or not the set input remains TRUE) until the reset input goes TRUE. The reset logic has priority over the set logic. Output "sc SLS_RESET_LOGIC_SLSL," SLS reset logic, is NOT output "SLS_ENG_LOGIC_SLSL."

The reset logic is described as follows: Input "LAT_STATIC_SHAPING_OUT_FL," shaped lateral stick command, is passed to an absolute value function and then a look-up table. The table output is equal to the input for values up to 10.0. The table output is passed to the "CV" input of an absolute compare function. The "IV" input to this compare function is "LONG_STATIC_SHAPING_OUT_FL," shaped longitudinal stick command. The output is TRUE when absolute IV is greater than CV. The output is passed to OR gate "F." Input "LONG_CMD_OUT_DETENT_DNTL," longitudinal stick out of detent logic, is passed to a TRUE State Delay. The output of this delay is FALSE if the input is FALSE or if the input is TRUE for less than 0.5 seconds, e.g., a short bump of the stick will not influence the engage logic. The output of the delay is passed to OR gate "F." Input "DIR_STATIC_SHAPING_OUT_FL," shaped directional command, is passed to an absolute compare function where it is compared with a value of 10%. The output is passed to OR gate "F." The output of OR gate "F" is passed to OR gate "H." Input "LONG_BEEP_CMD_BPP," longitudinal beep command, is passed to an absolute compare function where it is compared with a value of 0.0. The output is passed to OR gate "H." Input "LONG_CYC_CMD_ON_LIMIT_CL," longitudinal cyclic command on limit logic, is passed to OR gate "H." Input "SLS_ENG_LOGIC_SLEL" (FIG. 1), the SLS enable logic, is passed to a NOT function. The output of the NOT is passed to OR gate "G." Input "PFCS_CLAWS_IC_LOGIC," PFCS control laws IC logic, is passed to OR gate "G." The output of OR gate "G" is passed to OR gate "H." The output of OR gate "H" is the "reset" input to latch function "E" (i.e. SLS engage logic is set to FALSE if any input to OR gate "H" goes TRUE).

Figure 6:
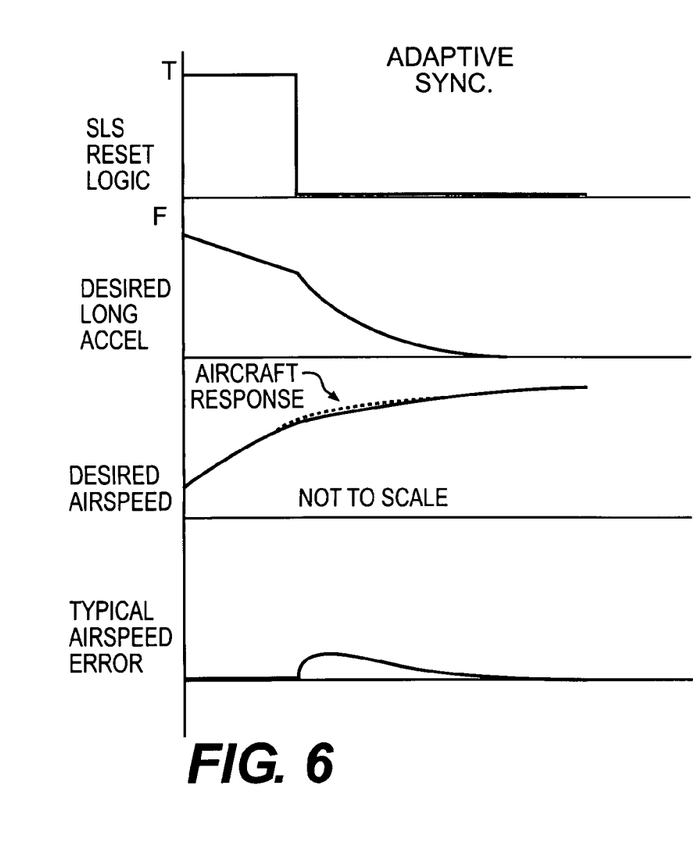
FIG. 6 is an graphical representation of the aircraft response when an adaptive synchronization function is used by the static longitudinal stability compensation control laws designed according to the present invention.

FIGS. 3A and 3B are a block diagram of the SLS compensation. Input "FILTERED_AIRSPEED_ASCF," filtered airspeed, is passed to a gain of 1.689 that scales the speed from knots to feet/second. This scaled airspeed is the "IC Var" input to integrator "I." Input "LONG-ACCEL_ASCF," filtered longitudinal acceleration, is the "IC Var" input to a lag function. The "Input" to this lag is a value of zero and the "Reset" logic is input "SLS_RESET_LOGIC_SLSL" (FIGS. 2A and 2B). When the Reset "SLS_RESET_LOGIC_SLSL" goes FALSE (SLS engages), the lag output starts at the IC Value and smoothly transitions to zero (FIG. 6). This lagged acceleration signal is the "Input" to integrator "I" and the "Reset" logic is input "SLS_RESET_LOGIC_SLSL" (from FIGS. 2A and 2B). The output of integrator "I" is the airspeed reference for the SLS compensation.

The net effect of this control law implementation is to provide a smooth transition when the SLS algorithm engages. The airspeed reference signal is the "+" input to summer "J." The scaled airspeed, from above, is limited and then passed to the "−" input of summer "J." The output of summer "J" is the airspeed error in feet/second.

The airspeed error is an input to multiplier block "K." The other input to the multiplier is the output of lookup table 1 that is scheduled with airspeed (currently a constant value of 1.0). This gain has the units of 1/seconds that scales the airspeed error to an acceleration signal. This acceleration command signal is then limited to ±4 ft/sec and is then passed to the "+" input of summer "N." The limiter output is also passed to multiplier "L" where it is multiplied by a lookup table output. The resultant trim rate signal is limited to ±1 inch/second and then passed to the PFCS model-following control laws (FIG. 4) integral path via output "SLS_INT_CMD_SLSC." Input "LONG_ACCEL_ASCF," filtered longitudinal acceleration, is the "+" input to summing junction "M." The "−" input to this summer is the lagged acceleration signal described previously. The second "+" input to summer "M" is input "PITCH_RATE_CMD_CM," a commanded pitch rate signal that has been lagged and scaled to yield a pseudo-acceleration signal.

Since pitch rate and longitudinal acceleration have opposite signs (i.e. positive pitch produces negative acceleration), this signal, which is generated by a pitch stick input, tends to cancel the acceleration feedback signal. The output of summer "M" is a corrected acceleration feedback signal. This corrected signal minimizes the transient when SLS engages and also cancels the short-term acceleration feedback when the pitch stick is moved. The output of summer "M" is the "−" input of summer "N."

The output of summing junction "N" is an acceleration error and follows two paths. In the first path, the output is passed to a washout function that creates a short-term pitch rate signal. This signal is limited to ±5 degrees/second and then passed through a symmetric fade function, controlled by input "SLS_ENB_LOGIC_SLEL" (FIG. 1), that has a time constant of 1 second. This pitch rate signal is passed to the primary flight control system via output "SLS_PITCH_RATE_CMD_SLSC." In the second path for the output of "N," the acceleration error is multiplied by the acceleration feedback gain, filtered by a lag function, passed through a fade function (controlled by input "SLS_ENB_LOGIC_SLEL" from FIG. 1) and then limited to ±2 inches of authority. The output is passed to the PFCS proportional path via output "SLS_PROP_CMD_SLSC."

The SLS Compensation control laws are designed to provide a seamless transition from the baseline rate command/attitude hold control shaping to an airspeed hold mode. A unique feature of the SLS CLaw is an adaptive synchronizer function that controls the desired aircraft response to mode engagement. This function is provided by the lag, integrator, and summing junction described in the detailed CLaw description (and shown separately in FIG. 5).

Figure 4:
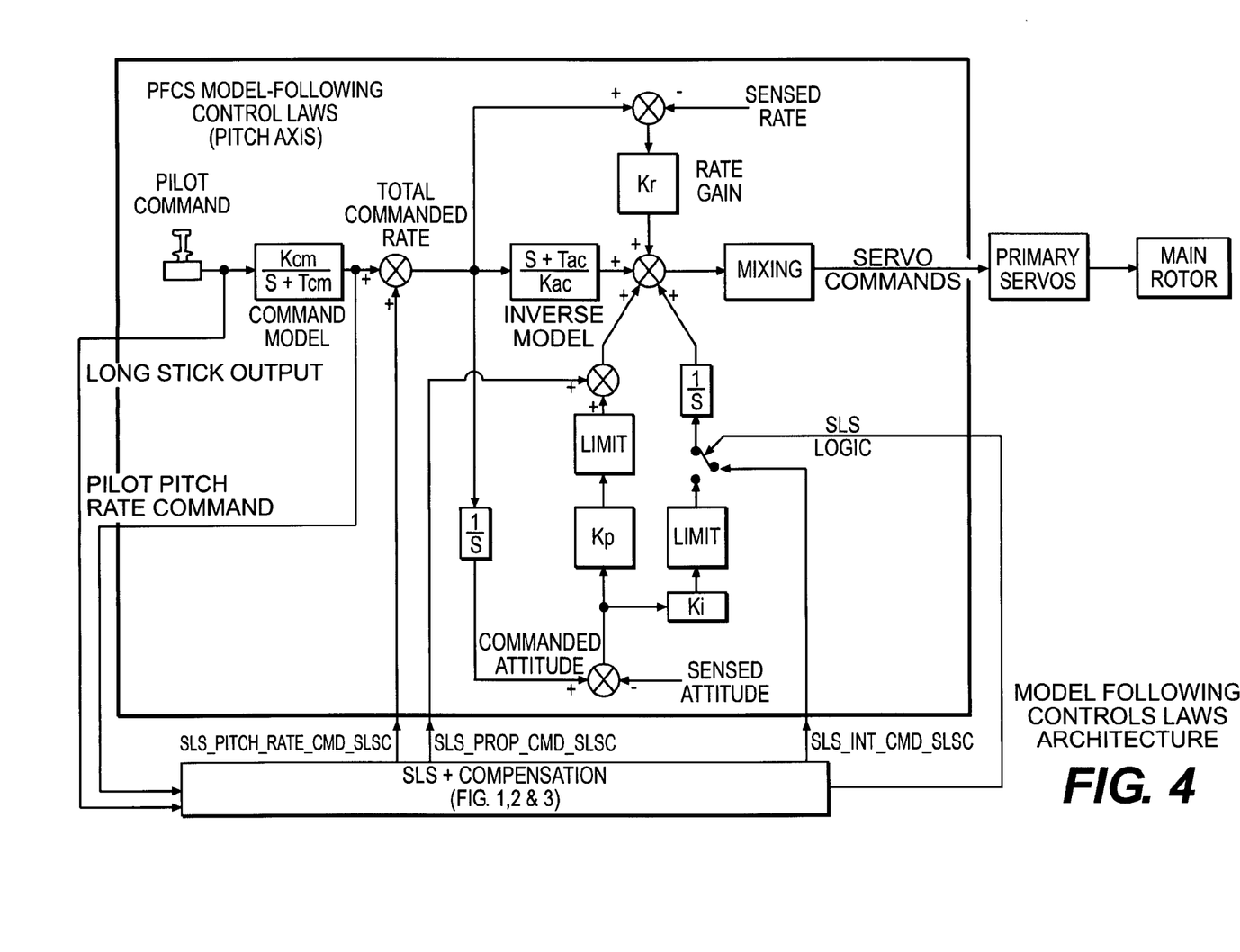
FIG. 4 is a block diagram of a PFCS model following control law schematic illustrating communication with the static longitudinal stability compensation control laws of FIGS. 3A and 3B.

Referring to FIG. 4, the SLS COMPENSATION generates 3 outputs that interface with the PFCS model following control laws as schematically illustrated. The "SLS_PITCH_RATE_CMD_SLCS" sums with the pilot pitch rate command to yield a total commanded pitch rate. This rate command is compared to the sensed pitch rate and the error is fed back to provide rate augmentation. The total commanded rate is also integrated to yield the commanded pitch attitude and then the sensed attitude is subtracted to yield an attitude error. This signal is fed back to provide attitude stabilization. The "SLS_PROP_CMD_SLSC" signal is summed with the attitude proportional feedback signal. When holding attitude, the attitude error is also integrated to drive any steady-state attitude errors to zero. When the SLS COMPENSATION is engaged, the "SLS_INT_CMD_SLSC" is substituted for the attitude signal in the integral path.

Figure 5:
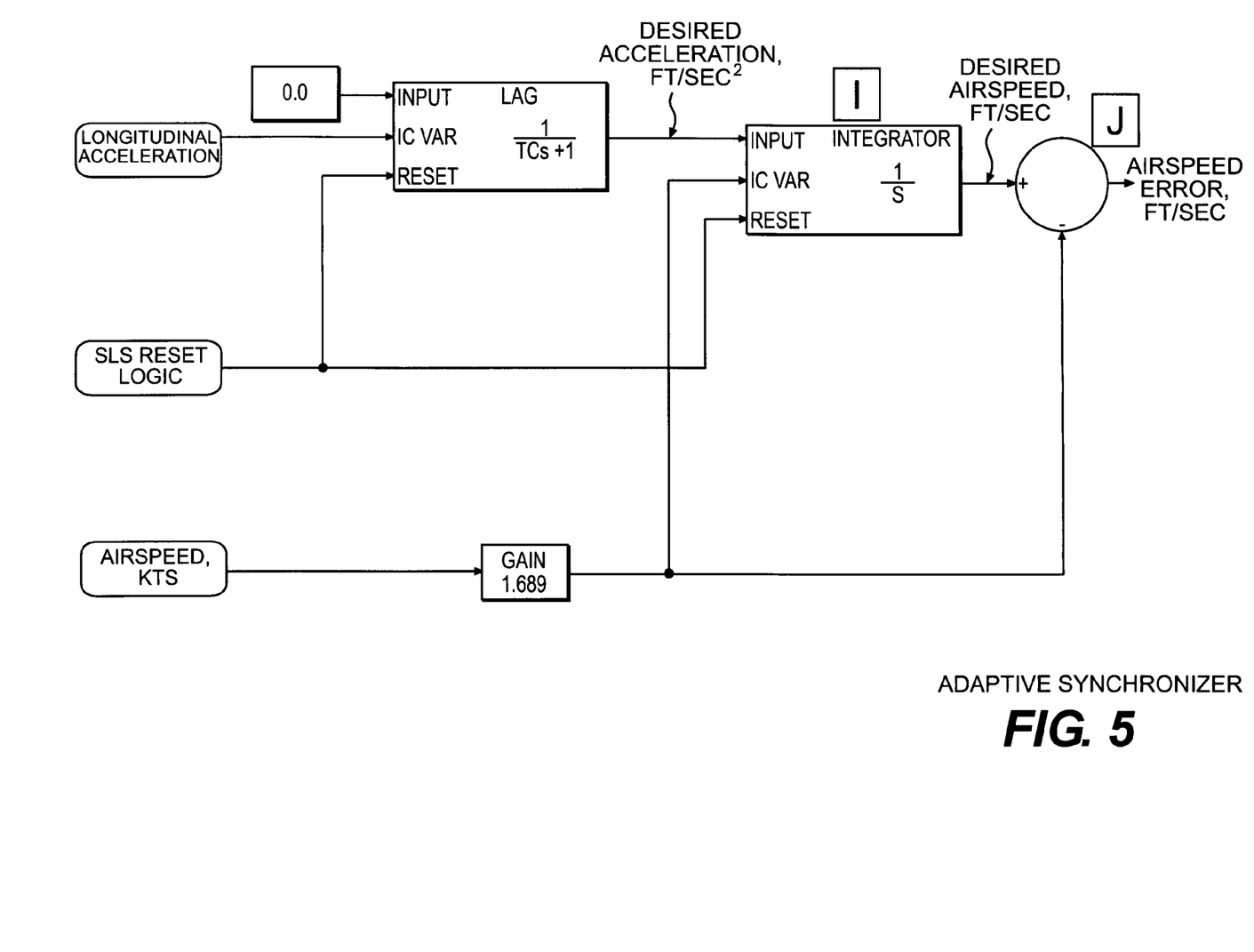
FIG. 5 is a block diagram of the adaptive synchronizer function of the static longitudinal stability compensation control laws of FIGS. 3A and 3B.

Referring to FIG. 5, the lag function has a zero value as its input and filtered longitudinal acceleration as its "IC VAR" input. The output of the lag, desired longitudinal acceleration, is shown in FIG. 6. At the moment when the SLS reset logic goes FALSE, the lag output stops tracking the IC value (longitudinal acceleration) and smoothly transitions to zero. The time constant of this lag controls how quickly the desired acceleration goes to zero. Desired longitudinal acceleration is then passed to the integrator, whose IC input is scaled airspeed. At the moment when the SLS reset logic goes FALSE (i.e. A/S Hold engages), the integrator output stops tracking the IC value (scaled airspeed) and smoothly integrates to a new, desired airspeed reference (scaled to ft/sec), as shown in FIG. 6. The Prior Art, a conventional synchronizer, produces a much more abrupt transition, as contrasted in FIGS. 6 and 7.

Figure 7:
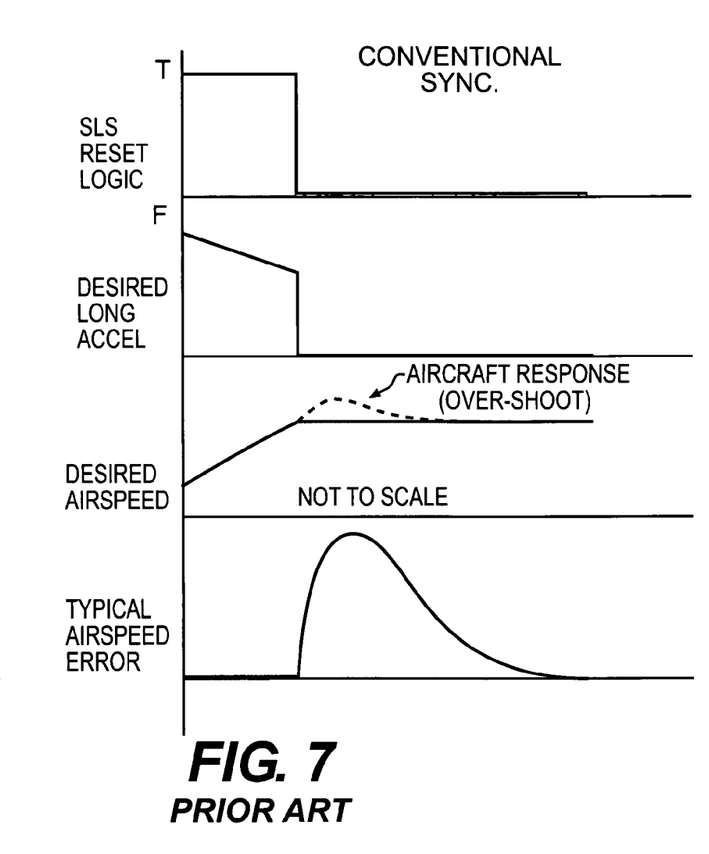
FIG. 7 is a graphical representation of the aircraft response when a PRIOR ART synchronization function is used in an airspeed hold system.

The scaled airspeed signal is subtracted from the desired airspeed to yield the airspeed error. The use of the adaptive synchronizer results in a smooth transition into airspeed hold, only a small error between desired and actual airspeed and no over-shoot of the steady-state airspeed reference. This is much more desirable than the prior art conventional response (FIG. 7). In a system using a conventional synchronizer (FIG. 7), the system selects the current airspeed as the reference when it engages. This would, in theory, force the aircraft acceleration to go to zero instantly. However the inertia of the aircraft forces the response to over-shoot the reference and then back up to the desired value.

The adaptive synchronizer output, airspeed error is multiplied by a gain with units of 1/second to yield an acceleration command (i.e. when the reference is greater than the actual airspeed, the aircraft must accelerate to reach the reference; FIG. 6). This signal is multiplied by a gain and then integrated by the control system trim integrator to drive any steady-state airspeed errors to zero.

The acceleration command is also compared to a corrected acceleration signal and this error is fed back (proportional path). The corrected acceleration signal consists of the actual acceleration minus the desired acceleration (from the adaptive synchronizer) minus the acceleration due to pilot longitudinal command. Removing the short term desired acceleration smoothes the transition to airspeed hold and removing the accel due to pilot command momentarily cancels the accel feedback if the pilot makes a pitch input while airspeed hold is engaged to keep the system from fighting the pilot. The acceleration feedback increases system bandwidth, but must be tuned/filtered appropriately to minimize any negative impact on ride comfort.

The acceleration error signal is also shaped via a gain and washout (FIGS. 3A and 3B; i.e. short-term derivative) to yield a pitch rate command to improve airspeed hold performance. All of the logic and compensation paths act together to provide a seamless integration of airspeed hold with the baseline control laws.

The adaptive synchronizer function can be applied to any signal whose rate (or reasonable approximation thereof) is available. For SLS Compensation, airspeed is the synchronized signal and longitudinal acceleration is the "rate" term. The objective of the adaptive synchronizer is to smoothly transition from a zero output to a measured reference error output. The smoothness of this transition is controlled by the time constraint of the lag function; the larger the time constraint, the longer the transition. The conventional synchronizer (FIG. 7) grabs the immediate value of airspeed as the trim value and the aircraft response must overshoot this value due to the forward acceleration of the aircraft at engagement (i.e., the acceleration at engagement cannot go to zero instantly). This acceleration must be stopped (which takes a finite amount of time) and then the aircraft must decelerate to get back to the desired trim value (and then that deceleration must be arrested). The result can be an unsatisfactory aircraft response when the mode engages. The adaptive synchronizer of the present application (FIG. 6) provides a more satisfactory (and adjustable) response. The main difference is that the airspeed reference is not just a "grabbed" value; instead, it is calculated as a function of the rate of change of airspeed, i.e., the function adapts to the aircraft flight condition at the moment of engagement. the smoothness of the engagement is due to the fact that the aircraft is allowed to smoothly approach the new airspeed reference by simply stopping the pre-existing acceleration. As shown in FIG. 6, the desired longitudinal acceleration takes a finite time to go to zero. This is the amount of time it takes the output of the lag to go from the acceleration at mode engagement (the initial condition value of the lag output) to zero (the input value). During this time, airspeed is being fed back to arrest this acceleration. As shown in FIG. 6, the aircraft response need not exactly match the desired response. Since there is no intent to drive the aircraft back to the original engagement airspeed, the overall maneuver is much more benign and engagement errors are small.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the TRUE scope and content of this invention.

What is claimed is:

1. A method of providing an airspeed hold function for a fly-by-wire system of a rotary-wing aircraft comprising the steps of:
    (1) determining when absolute pitch, roll and yaw rate are each below a predetermined value;
    (2) stopping a pre-existing aircraft acceleration or deceleration such that the aircraft airspeed moves toward an airspeed reference in response to said step (1); and
    (3) maintaining the aircraft airspeed at the airspeed reference.

2. A method as recited in claim 1, wherein said step (1) further comprises determining whether airspeed is greater than a predetermined value.

3. A method as recited in claim 1, wherein said step (1) further comprises determining whether an absolute bank angle is below a predetermined bank value.

4. A method as recited in claim 1, wherein said step (1) further comprises determining whether a pitch attitude is below a predetermined pitch attitude.

5. A method as recited in claim 1, wherein said step (1) further comprises determining whether full primary flight control system mode is available.

6. A method as recited in claim 5, wherein primary flight control system mode is available when a predetermined quantity of sensor data is available to the fly-by-wire system.

7. A method as recited in claim 1, wherein said step (1) occurs at an engagement airspeed other than the airspeed reference.

8. A method as recited in claim 1, further comprising the step of deactivation of the airspeed hold function in response to an absolute pilot longitudinal cyclic stick command is out of detent for a time greater than a predetermined value.

9. A method as recited in claim 1, further comprising the step of deactivation of the airspeed hold function in response to an absolute pilot longitudinal cyclic stick command greater than a predetermined value that is a function of lateral stick displacement.

10. A method as recited in claim 1, further comprising the step of deactivation of the airspeed hold function in response to a longitudinal cyclic rotor command reaches a limit.

11. A method as recited in claim 1, further comprising the step of deactivation of the airspeed hold function in response to an absolute shaped yaw command greater than a predetermined value.

12. A method as recited in claim 11, further comprising the step of:
    (3) maintaining the aircraft airspeed at the airspeed reference.

13. A method as recited in claim 1, wherein said step (2) is activated in response to maintaining an airspeed at a desired airspeed for a predetermined time period.

14. A method as recited in claim 1, wherein said step (2) is activated in response to maintaining a longitudinal acceleration below a predetermined value.

15. A method as recited in claim 1, wherein said step (2) is activated in response to trimming the aircraft to an accelerating/decelerating maneuver; and
    waiting until a longitudinal acceleration is below a predetermined value.

16. A method of providing an airspeed hold function for a fly-by-wire system of a rotary-wing aircraft comprising the steps of:

(1) calculating an airspeed reference as a function of a rate of change of an aircraft airspeed; and
(2) stopping a pre-existing aircraft acceleration or deceleration such that the aircraft airspeed moves toward the airspeed reference.

17. A method as recited in claim 16, wherein said step (2) occurs over a finite amount of time.

18. A method as recited in claim 17, wherein the finite amount of time is defined by a time for a lag output to progress from the pre-existing aircraft acceleration to zero.

* * * * *